United States Patent
Wu et al.

(10) Patent No.: US 8,261,350 B2
(45) Date of Patent: Sep. 4, 2012

(54) SYSTEM AND METHOD FOR PROTECTING COMMUNICATION DEVICES FROM DENIAL OF SERVICE ATTACKS

(75) Inventors: Chwan-Hwa Wu, Auburn, AL (US); J. David Irwin, Auburn, AL (US); Chien-Cheng Wang, Chiayi (TW); Chun-Ching Huang, Richmond (CA)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 12/985,082

(22) Filed: Jan. 5, 2011

(65) Prior Publication Data

US 2011/0099630 A1      Apr. 28, 2011

Related U.S. Application Data

(63) Continuation of application No. 11/694,174, filed on Mar. 30, 2007, now Pat. No. 7,937,759, which is a continuation-in-part of application No. 10/956,568, filed on Oct. 1, 2004, now Pat. No. 7,774,841.

(60) Provisional application No. 60/787,625, filed on Mar. 30, 2006, provisional application No. 60/792,817, filed on Apr. 17, 2006, provisional application No. 60/799,606, filed on May 11, 2006, provisional application No. 60/508,127, filed on Oct. 2, 2003, provisional application No. 60/509,650, filed on Oct. 8, 2003.

(51) Int. Cl.
*H04L 29/06* (2006.01)
(52) U.S. Cl. ........................................ 726/22
(58) Field of Classification Search .............. 726/4, 11, 726/13, 14, 22, 23
See application file for complete search history.

(56) References Cited

U.S. PATENT DOCUMENTS

| | | | |
|---|---|---|---|
| 5,091,942 A | 2/1992 | Dent | 380/46 |
| 5,237,612 A | 8/1993 | Raith | 380/247 |
| 5,841,871 A | 11/1998 | Pinkas | 713/155 |
| 6,002,769 A | 12/1999 | McGough | 380/28 |
| 6,058,189 A | 5/2000 | McGough | 380/28 |
| 6,266,413 B1 | 7/2001 | Shefi | 380/46 |
| 6,445,797 B1 | 9/2002 | McGough | 380/285 |

(Continued)

FOREIGN PATENT DOCUMENTS
WO      WO 2011/053425      5/2011

OTHER PUBLICATIONS

Dwork et al., "Pricing via Processing or Combatting Junk Mail", in E. Brickell, editor, *Proceedings of Advances in Cryptology—Proc. CRYPTO '92*, vol. 1323 of LNCS, Santa Barbara, CA USA, Aug. 1992, pp. 139-147.

(Continued)

*Primary Examiner* — Edward Zee
(74) *Attorney, Agent, or Firm* — Pillsbury Winthrop Shaw Pittman LLP

(57) ABSTRACT

A system for preventing successful denial of service attacks comprises a first communication device, a second communication device, and a network. The first and second communication devices establish a communication session via the network. Based on various information, such as a pre-shared secret, one of the communication devices determines a network access filter value and compares this value to at least one data frame in order to authenticate such data frame without committing significant computing resource and any memory space. By updating the network access filter over time, an unauthorized user who discovers the outdated network access filter values is prevented from successfully launching a denial of service attack.

10 Claims, 7 Drawing Sheets

| | | |
|---|---|---|
| Entry 1 | User ID | Access Filter Value |
| Entry 2 | User ID | Access Filter Value |
| Entry 3 | User ID | Access Filter Value |
| ⋮ | ⋮ | ⋮ |
| Entry n | User ID | Access Filter Value |

U.S. PATENT DOCUMENTS

| | | | | |
|---|---|---|---|---|
| 6,487,660 | B1 | 11/2002 | Vanstone et al. | 713/168 |
| 6,891,952 | B1 | 5/2005 | Puehlhoefer et al. | 380/262 |
| 7,139,679 | B1 * | 11/2006 | McGrew | 702/186 |
| 7,290,281 | B1 | 10/2007 | McGrew | 726/23 |
| 7,774,841 | B2 | 8/2010 | Wu et al. | 726/22 |
| 7,937,759 | B2 | 5/2011 | Wu et al. | 726/22 |
| 8,127,355 | B2 | 2/2012 | Wu et al. | 726/22 |
| 2003/0149876 | A1 | 8/2003 | McGough | 713/171 |
| 2003/0177391 | A1 | 9/2003 | Ofek et al. | 713/201 |
| 2004/0250061 | A1 | 12/2004 | Yamauchi et al. | 713/155 |
| 2005/0144352 | A1 | 6/2005 | Wu et al. | 711/100 |
| 2005/0198489 | A1 | 9/2005 | Wallace et al. | 713/151 |
| 2006/0034456 | A1 | 2/2006 | McGough | 380/30 |
| 2006/0143453 | A1 | 6/2006 | Imamoto et al. | 713/169 |
| 2007/0266241 | A1 | 11/2007 | Wu et al. | 713/160 |
| 2008/0016354 | A1 | 1/2008 | Wilding et al. | 713/171 |
| 2008/0046727 | A1 | 2/2008 | Kanekar et al. | 713/168 |
| 2008/0184031 | A1 | 7/2008 | McGough | 713/171 |
| 2008/0229105 | A1 | 9/2008 | Jeffries et al. | 713/169 |
| 2009/0037725 | A1 | 2/2009 | Farrugia et al. | 713/155 |
| 2010/0242112 | A1 | 9/2010 | Wu et al. | 726/22 |
| 2010/0287610 | A1 | 11/2010 | Joffray | 726/19 |
| 2011/0099623 | A1 | 4/2011 | Garrard et al. | 726/14 |

OTHER PUBLICATIONS

Aura et al., "Stateless Connections" in *Proc. of International Conference on Information and Communications Security (ICICS '97)*, Lecture Notes in Computer Science, vol. 1334, Springer, Nov. 1997, pp. 87-97.

Perlman, Radia, "Understanding IKEV2: Tutorial, and Rationale for Decisions", draft-ieff-ipsec-ikev2-tutorial-01.txt, Feb. 2003.

Aiello et al., "Efficient, DoS-Resistant, Secure Key Exchange for Internet Protocols", in *Proceedings of the 9th ACM Conference on Computer and Communications Security*, Washington, D.C., 2002, 11 pages.

Juels et al., "Client Puzzles: A Cryptographic Countermeasure Against Connection Depletion Attacks", in *Proc. of the Network and Distributed Systems Security Symposium (NDSS '99)*, pp. 151-165, Feb. 1999.

Leiwo, Jussipekka, et al., "Towards Network Denial of Service Resistant Protocols", in *Proc. of International Information Security Conference (IFIP?SEC)*, Aug. 2000, 10 pages.

Aura et al., "DoS-Resistant Authentication with Client Puzzles", in *Proc. of the 8th International Workshop on Security Protocols*, Apr. 2000, 8 pages.

* cited by examiner

| Entry 1 | User ID | Access Filter Value |
| Entry 2 | User ID | Access Filter Value |
| Entry 3 | User ID | Access Filter Value |
| ⋮ | ⋮ | ⋮ |
| Entry n | User ID | Access Filter Value |

SYSTEM AND METHOD FOR PROTECTING COMMUNICATION DEVICES FROM DENIAL OF SERVICE ATTACKS

CROSS-REFERENCE TO RELATED APPLICATIONS

This application is a continuation of U.S. patent application Ser. No. 11/694,174, entitled "System and Method for Protecting Communication Devices from Denial of Service Attacks," filed on Mar. 30, 2007, which issued as U.S. Pat. No. 7,937,759 on May 3, 2011, and which claims the benefit of U.S. Provisional Patent Application Ser. No. 60/787,625, entitled "New Improvement of IPACF (Identity-Based Privacy-Protected Access Control Filter)," filed on Mar. 30, 2006, U.S. Provisional Patent Application Ser. No. 60/792,817, entitled "Using Identity-Based Privacy-Protected Access Control Filter (IPACF) Against Denial of Service Attacks and to Protect User Privacy," filed on Apr. 27, 2006, and U.S. Provisional Patent Application Ser. No. 60/799,606, entitled "Pseudo ID," filed on May 11, 2006.

In addition, the above-referenced U.S. patent application Ser. No. 11/694,174, which this application is a continuation of, is also a continuation-in-part of U.S. patent application Ser. No. 10/956,568, entitled "System and Method for Protecting Network Resources from Denial of Service Attacks," filed on Oct. 1, 2004, which issued as U.S. Pat. No. 7,774,841 on Aug. 10, 2010, and which claims the benefit of U.S. Provisional Patent Application Ser. No. 60/508,127, entitled "Multifaceted Wireless Security Protocols and Schemes," filed on Oct. 2, 2003, and U.S. Provisional Patent Application Ser. No. 60/509,650, entitled "Security Measures for Wireless Networks," filed on Oct. 8, 2003.

The contents of the above-referenced U.S. Patents, U.S. Patent Applications, and U.S. Provisional Patent Applications are hereby incorporated by reference in their entirety.

RELATED ART

A denial of service (DoS) attack is a well-known problem for networks and can significantly disrupt the operation and performance of network resources. In a denial of service attack, a malicious user of the network sends a large number of message frames to a network device within a short period of time. Servicing the large number of message frames usurps a significant amount of the device's processing resources and capabilities thereby preventing the device from servicing message frames from legitimate users for at least a finite period of time. Indeed, in some circumstances, denial of service attacks have been known to cause a network device to temporarily "crash" such that it is incapable of servicing any message frames from legitimate users for a significant period of time.

Denial of service attacks can be quite costly, especially for network devices that sell products or otherwise generate revenue during operation. In this regard, even if a denial of service causes a network device to crash for only a small amount of time, the lost revenue resulting from the period of inoperativeness can be quite extensive. Thus, techniques have been developed for protecting against denial of service attacks. However, many of the conventional techniques used to protect against denial of service attacks have vulnerabilities that malicious users can exploit in order to successfully launch a denial of service attack.

For example, some network devices maintain a list of authorized users. In such an example, a network device stores a user identifier (ID) unique to each authorized user. As an example, a user's internet protocol (IP) address or password may be stored as a user ID. Before servicing a message frame, the device finds the user ID within the frame and compares it to the list of stored user IDs. If there is a match, the device authenticates the message (i.e., validates the message as being from an authorized user) and processes the message frame. If there is not a match, the device discards the message frame without processing it further. Thus, the device does not significantly process a message frame unless it has been authenticated.

The foregoing techniques have been successful in reducing the number and frequency of successful denial of service attacks. However, it is possible for a malicious user to discover a valid user ID and to thereafter use the misappropriated user ID to successfully launch an attack against a network device. In this regard, using the misappropriated user ID, it is possible for the malicious user to spoof the device such that it authenticates the message frames sent by the malicious user. In such a situation, the malicious user may successfully launch a spoofed attack even if the network device utilizes user ID checking to protect against unauthorized access.

Of course, encrypting the user ID can help to prevent malicious users from discovering it. However, decryption of the user ID of a message frame would likely require the network device to save a state of the message frame and to perform various processing to recover the user ID. Thus, the device would still be susceptible to denial of service attacks. In this regard, it would be possible for a malicious user to transmit, to the network device, a sufficient number of message frames such that the device remains busy trying to decrypt the user IDs of the message frames regardless of whether the user IDs are valid. Thus, while it is decrypting the user IDs of such messages, the network device may be unable to receive and process message frames from authorized users. As a result, user IDs that are used to protect against denial of service attacks are normally unencrypted thereby making it easier for a malicious user to discover valid user IDs.

Moreover, better techniques are needed for protecting network resources against denial of service attacks.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
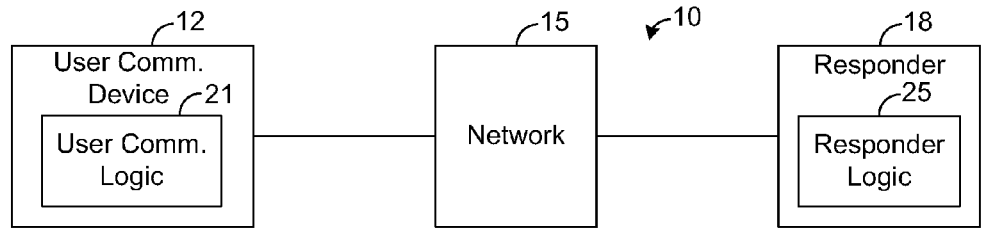
FIG. 1 is a block diagram illustrating an exemplary network communication system in accordance with one embodiment of the present disclosure.

The present disclosure generally pertains to systems and methods for protecting network resources from denial of service attacks. In one exemplary embodiment, a network device, referred to herein as a "responder," stores a parameter, referred to herein as an "access filter value," that is used to determine whether an incoming message frame has been transmitted from an authorized user. In this regard, another network device, referred to herein as a "user communication device," includes logic for determining the access filter value stored at the responder and includes the access filter value in a message frame transmitted from the user communication device to the responder. The responder first compares the received access filter value to the stored access filter value. If such values match or otherwise correspond, the responder authenticates the message frame and further processes the message frame. However, if such values do not match or otherwise correspond, the responder discards the message frame. Thus, the responder processes authenticated message frames and discards unauthenticated message frames thereby preventing denial of service attacks from malicious users. Exemplary techniques for authenticating message frames are described in U.S. patent application Ser. No. 10/956,568, entitled "System and Method for Protecting Network Resources from Denial of Service Attacks," and filed on Oct. 1, 2004, which is incorporated herein by reference.

Moreover, the comparison of the access filter values can be performed in a relatively short period of time, and it is unnecessary for the responder to save a state of the message frame before deciding whether the message frame should be discarded. In this regard, it is possible for the responder to accept or reject a current message frame before the next message frame is to be evaluated by the responder. Thus, even if a malicious user transmits a large number of frame messages in a short period of time, the responder should be able to reject such message frames without preventing the responder from processing other message frames from authorized users. Accordingly, the attempted denial of service attack can be prevented.

In one embodiment, the stored access filter value is updated from time-to-time (e.g., each time the responder receives a message frame from or transmits a message frame to the authorized user), and the logic at the user communication device is provided with sufficient information for determining the updated access filter value. Thus, even if a malicious user intercepts or otherwise discovers a previously-used access filter value, the malicious user will be unable to utilize this value to spoof the responder and thereby launch a successful denial of service attack. In this regard, the responder preferably does not authenticate message frames from the malicious user since the previously-used access filter value contained in such message frames does not match or otherwise correspond to the updated access filter value stored at the responder. Further, similar techniques may be employed to protect the user communication device 12 from a denial of service attack.

FIG. 1 depicts a network communication system 10 in accordance with one exemplary embodiment of the present disclosure. As shown by FIG. 1, the system 10 comprises a user communication device 12, such as a computer, coupled to a network 15, such as the Internet, for example. As shown by FIG. 1, a responder 18 is remotely located from the device 12 and is also coupled to the network 15. As used herein, a "responder" refers to any network resource (e.g., a server, gateway, firewall, virtual private network (VPN), etc.) that responds to message frames. User communication logic 21 within the device 12 is configured to communicate with responder logic 25 within the responder 18.

In particular, message frames transmitted by the user communication logic 21 include a destination identifier, such as an Internet Protocol (IP) address, that identifies the responder 18. Based on this destination identifier, the network 15 routes the foregoing message frames to the responder 18, and the responder logic 25 receives and processes the message frames, as will be described in more detail hereafter. Similarly, message frames transmitted by the responder logic 25 include a destination identifier, such as an IP address, that identifies the user communication device 12. Based on this destination identifier, the network 15 routes the foregoing message frames to the user communication device 12, and the logic 21 receives and processes the message frames, as will be described in more detail hereafter.

Figure 2:
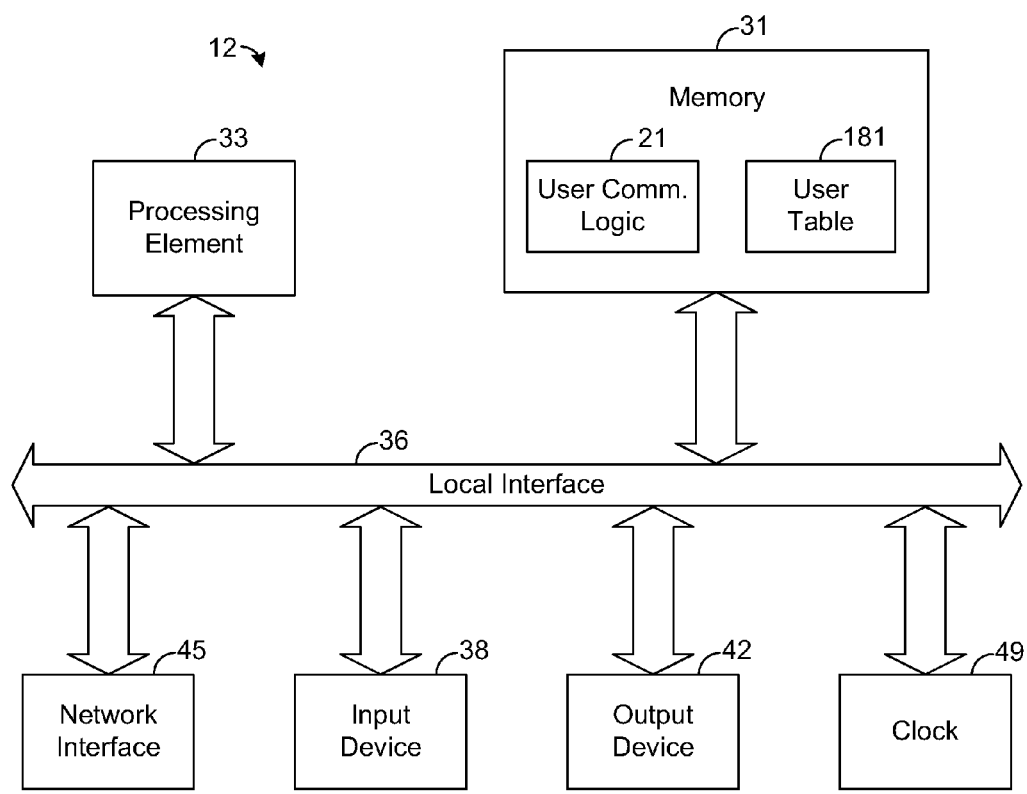
FIG. 2 is a block diagram illustrating a user communication device depicted in FIG. 1.

FIG. 2 depicts a more detailed view of the user communication device 12. In the exemplary embodiment shown by FIG. 2, the user communication logic 21 is implemented in software and stored within memory 31 of the device 12. However, in other embodiments, the user communication logic 21 may be implemented in hardware, software, or a combination thereof.

The exemplary embodiment of the user communication device 12 depicted by FIG. 2 comprises one or more conventional processing elements 33, such as a digital signal processor (DSP) or a central processing unit (CPU), that communicate to and drive the other elements within the device 12 via a local interface 36, which can include one or more buses. When the user communication logic 21 is implemented in software, as shown by FIG. 2, the processing element 33 can be configured to execute instructions of the logic 21. Furthermore, an input device 38, for example, a keyboard or a mouse, can be used to input data from a user of the device 12, and an output device 42, for example, a printer or a monitor, can be used to output data to the user.

A network interface 45, such as a modem, is coupled to the network 15 (FIG. 1) and enables the device 12 to communicate with the network 15. Note that the network interface 45 may be coupled to the network 15 via one or more wireless or non-wireless channels. Further, clock 49 tracks time and provides time data indicative of the current time. As an example, the clock 49 may be configured to provide a set of time data, sometimes referred to as a "time stamp," that is indicative of the current time when the time stamp is generated.

Figures 3, 4:
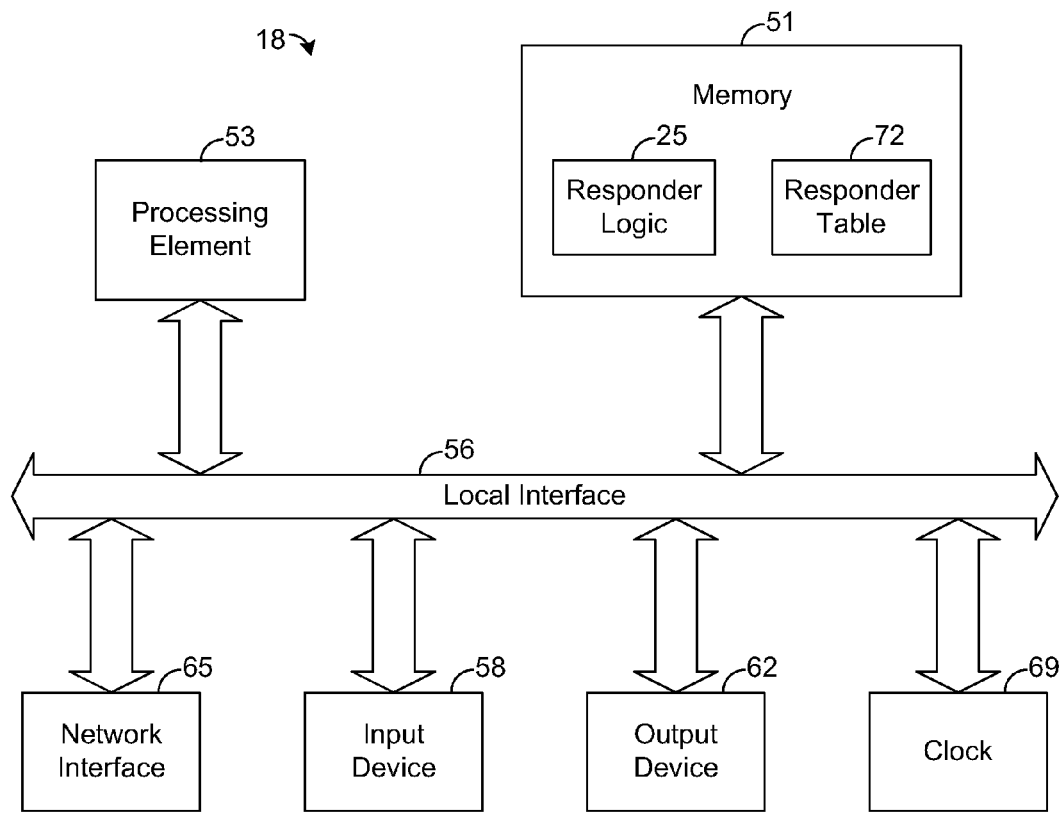
FIG. 3 is a block diagram illustrating a responder depicted in FIG. 1.
FIG. 4 is a block diagram illustrating a responder table depicted in FIG. 3.

FIG. 3 depicts a more detailed view of the responder 18. In the exemplary embodiment shown by FIG. 3, the responder logic 25 is implemented in software and stored within memory 51 of the responder 18. However, in other embodiments, the responder logic 25 may be implemented in hardware, software, or a combination thereof.

The exemplary embodiment of the responder 18 depicted by FIG. 3 comprises one or more conventional processing elements 53, such as a digital signal processor (DSP) or a central processing unit (CPU), that communicate to and drive the other elements within the responder 18 via a local interface 56, which can include one or more buses. When the responder logic 25 is implemented in software, as shown by FIG. 3, the processing element 53 can be configured to execute instructions of the responder logic 25. Furthermore, an input device 58, for example, a keyboard or a mouse, can be used to input data from a user of the responder 18, and an output device 62, for example, a printer or a monitor, can be used to output data to the user.

A network interface 65 is coupled to the network 15 (FIG. 1) and enables the responder 18 to communicate with the network 15. Note that the network interface 65 may be coupled to the network 15 via one or more wireless or non-wireless channels. Further, clock 69 tracks time and provides time data indicative of the current time. As an example, the clock 69 may be configured to provide a set of time data, sometimes referred to as a "time stamp," that is indicative of the current time when the time stamp is generated.

Note that the user communication logic 21 and/or the responder logic 25, when implemented in software, can be stored and transported on any computer-readable medium for use by or in connection with an instruction execution system or device, such as a computer-based system, processor-containing system, or other system that can fetch and execute instructions. In the context of this document, a "computer-readable medium" can be any medium that can contain, store, communicate, propagate, or transport a program for use by or in connection with an instruction execution system or device. Note that the computer-readable medium could even be paper or another suitable medium upon which the program is printed, as the program can be electronically captured, via for instance optical scanning of the paper, then compiled, interpreted or otherwise processed in a suitable manner if necessary, and then stored in a computer memory.

The responder logic 25 is configured to maintain a table 72 of access filter values. The table 72 comprises an access filter value for each user that is authorized to access the responder 18. In one embodiment, the table 72 comprises n number of entries, where n is any positive integer. As shown by FIG. 4, each entry has a user ID, such as an IP address, that identifies an authorized user, as well as the access filter value associated with such user. The entries may include other information as well.

Moreover, before a user is allowed to communicate with the responder 18, the user ID and access filter value associated with the user are defined and stored in the table 72. Further, the user is provided with information, referred to hereafter as "pre-shared secret," that is to be used to determine the access filter value for authenticating the user. The secret is "pre-shared" in the sense that it is shared before establishment of the communication session between the responder 18 and the device 12 in which the access filter value is to be used to authenticate messages, as further described hereinbelow. In this regard, when the user utilizes the device 12 to transmit a message frame to the responder 18, the user communication logic 21 is configured to include, in the message frame, the user ID and access filter value associated with the user. Although portions of the message frame may be encrypted, the user ID and access filter value are preferably unencrypted so that the responder 18 may quickly authenticate the message frame based on such parameters, as will be described in more detail below.

Instead of being pre-shared, the foregoing secret can be transmitted to the user communication device 12 over the network 15 at the beginning of the communication session between the device 12 and responder 18. For example, the responder logic 25 may be configured to encrypt the pre-shared secret and transmit such information in a message frame over network 15 to the user communication device 12. However, at this point, the user communication logic 21 does not have sufficient information to authenticate such message frame according to the techniques described herein. Thus, the user communication device 12 may be vulnerable to a denial of service attack assuming that the user communication logic 21 does not have an alternative way of authenticating the message frame containing the secret. In this regard, since the user communication logic 21, in the instant example, must decrypt the message frame in order to discover the secret, the user communication logic 21 would presumably decrypt message frames sent by malicious users prior to receiving the secret and using this information to determine the initial filter value to be used for authentication of messages as described herein. Decryption of message frames from malicious users would require the user communication logic 21 to save a state of the message and utilize resources for the decryption process. Thus, if a denial of service attack is launched by a malicious user prior to the user communication logic 21 receiving the secret, the user communication logic 21 would likely be vulnerable to such attack.

To avoid the foregoing vulnerability at the user communication device 12, the secret could be transmitted over the network 15 unencrypted. However, not encrypting the secret makes it easier for a malicious user to discover such information, thereby possibly compromising the security of the system 10. In this regard, a malicious user may try to use the secret to determine a valid access filter value that is used to authenticate messages according to the techniques described herein.

To alleviate some of the foregoing concerns, the secret is preferably pre-shared. In this regard, rather than transmitting the secret over the network 15 during the communication session between the user communication device 12 and the responder 18 in either encrypted or unencrypted form, the secret is instead secretly provided to the user of the device 12 prior to the communication session. For example, the pre-shared secret may be mailed to the user of the device 12 via U.S. mail or some other form of parcel or letter delivery. In another example, the user of the device 12 is called via telephone and is verbally told, either by another person or via an electronically generated message, the pre-shared secret. In yet another example, the pre-shared secret is electronically transmitted to the user communication device 12 and/or responder via a secure communication channel. Any known or future-developed technique for establishing a pre-shared secret may be used, and it is possible for the user and/or user communication device 12 to generate at least a portion of the pre-shared secret and provide it to the operator and/or responder 18.

In one exemplary embodiment, the user of device 12 completes a registration process before communication between the responder 18 and device 12 is allowed. For example, the user may personally contact an operator of the responder 18 via telephone or some other form of communication or meet the operator in person. As used herein, an "operator" can be any person that has authorized access to the responder 18. The user may provide the operator with various information such as his or her name, address, telephone number, etc. Further, the operator provides the user with the pre-shared secret. For example, if the pre-shared secret comprises a randomly generated number, the operator may convey verbally or otherwise the randomly generated number to the user.

After exchanging information, the operator enters the pre-shared secret via input device 58, if such information is not already available to the responder 18. For example, the operator may type such information using a keyboard. Once the pre-shared secret is available to the responder 18, the responder logic 25 uses the pre-shared secret to calculate the access filter value to be used to authenticate messages from the user. The responder logic 25 also correlates this access filter value with the user ID and stores this information in the table 72 so that the calculated access filter value may be used to authenticate at least one message from the user communication device 21 according to the techniques described herein.

In addition, the user enters the pre-shared secret via input device 38. For example, the user may type the pre-filer information using a keyboard. Based on the pre-shared secret, the user communication logic 21 calculates the access filter value that is to be sent to the responder 18 to enable it to authenticate at least one message from the user communication device 12 according to the techniques described herein.

Moreover, using a pre-shared secret to calculate the access filter value helps to protect against denial of service attacks targeting the user communication device 12. In this regard, since it is unnecessary for the user communication logic 21 to decrypt messages from the network 15 in order to discover the pre-shared secret, the user communication logic 21 can be configured to reject messages from the network 15 prior to calculating access filter values that can be used to authenticate messages between the user communication device 12 and responder 18. Thus, if a malicious user tried to launch a denial of service attack by transmitting a large number of encrypted messages to the user communication device 12 prior to the calculation of an access filter value by the logic 21, the user communication logic 21 can reject such messages without decrypting them. Therefore, such a denial of service attack should be thwarted.

Once the user communication logic 21 has access to the pre-shared secret and has determined the access filter value for authenticating the user, the user communication logic 21 uses the access filter value to communicate with the responder 18. In this regard, when the user utilizes the device 12 to transmit a message frame to the responder 18, the user communication logic 21 is configured to include, in the message frame, the user ID and access filter value associated with the user. For each message frame transmitted to the responder 18, the responder logic 25 uses the user ID included in the message frame to retrieve, from the table 72, the access filter value associated with the user that transmitted the message frame. In the instant example, the responder logic 25 searches the table 72 for the entry having the user ID, and retrieves the access filter value included in this entry. The responder logic 25 then compares the retrieved access filter value with the access filter value from the message frame.

If there is a correspondence between the compared values (e.g., if the compared values match), then the responder logic 25 authenticates the message frame as coming from an authorized user. In such an example, the responder logic 25 saves a state of the message frame to memory 51 and further processes the message frame. As an example, if a portion of the message frame is encrypted, the responder logic 25 may decrypt such portion. If the message frame includes a request for data, the responder logic 25 may be configured to transmit the requested data via one or more message frames to the user communication device 12. Various other techniques for processing the authenticated message frame are possible in other examples.

However, if there is no correspondence between the compared access filter values (e.g., if the access filter value received from the user communication device 12 does not match the access filter value retrieved from the table 72), then the responder logic 25 discards the message frame. In this regard, the message frame is preferably discarded before the responder logic 25 stores any state of the message frame to memory 51 or performs any significant processing of the message frame. Thus, if a malicious user transmits a message frame that does not include an access filter value associated with an authorized user, the responder logic 25 quickly discards the message frame once it arrives at the responder 18. Moreover, even if a malicious user launches a denial of service attack by transmitting, to the responder 18, a large number of message frames in a short amount of time, the responder 18 should be able to quickly discard such message frames without disrupting its operation in servicing other message frames from authorized users. In other words, the responder 18 should be able to successfully defend against the denial of service attack.

In one embodiment, the responder logic 25 updates an access filter value stored in the table 72 after using such value to authenticate an incoming message. In this regard, once a message frame from a user is authenticated, the responder logic 25 calculates a new access filter value for the user based on a predetermined algorithm that utilizes a dynamically generated value, such as a randomly generated number or a time stamp value from the clock 69. The responder logic 25 then replaces the user's access filter value currently stored in the table 72 with the new access filter value. Thus, for the next message frame transmitted by the user, the responder logic 25 preferably uses the new access filter value to authenticate the message frame. Therefore, even if a malicious user discovers the previously-used access filter value, the malicious user should be prevented from using such value to launch a successful denial of service attack against the responder 18.

However, for the user's next message frame to be authenticated by the responder 18, the message frame should include the new access filter value that is used to replace the previously-used access filter value. Thus, once the responder logic 25 calculates the new access filter value, the logic 25 transmits, to the device 12, sufficient information for enabling the user communication logic 21 to also calculate the new access filter value. For example, if a dynamically generated value is used by the responder logic 25 to calculate the new access filter value, as described above, the responder logic 25 may transmit the dynamically generated value to the user communication logic 21. Note that the dynamically generated value may be encrypted according to any known or future-developed encryption scheme.

After receiving the dynamically generated value, the user communication logic 21 is configured to use this value to calculate the new access filter value. In this regard, the user communication logic 21 may be aware of the same algorithm used by the responder logic 25 to calculate the new access filter value and utilize this algorithm, in conjunction with the dynamically generated value, to also calculate the new access filter value. The user communication logic 21 then stores the new access filter value so that it is available for the next message frame to be transmitted to the responder 18.

In this regard, when a new message frame is to be transmitted to the responder 18, the user communication logic 21 retrieves the new access filter value and includes this value in the new message frame. Thus, when the responder 18 receives the new message frame, the responder logic 25 authenticates the new message frame based on the new access filter value. Accordingly, the aforedescribed update to the access filter value stored in table 72 may prevent an unauthorized user who discovers the previously-used access filter value from successfully launching a denial of service attack without preventing the authorized user from accessing the responder 18.

Further, the user communication logic 21 and the responder logic 25 may be configured to employ similar techniques to authenticate messages transmitted from the responder 18 to the user communication device 12. Since it is unnecessary for the user communication logic 21 or the responder logic 25 to decrypt messages during the communication session in order to authenticate the incoming packet, it is unnecessary for either the user communication logic 21 or the responder logic 25 to accept any encrypted messages that do not have a valid access filter value. Thus, both the user communication device 12 and responder 18 should be able to thwart a denial of service attack at any point during the communication session.

An exemplary operation of the responder logic 25 and user communication logic 21 will now be described with particular reference to FIGS. 5 and 6. In the example described hereafter, the responder logic 25 will be described as having an access filter value, referred to as "responder filter value" for authenticating messages received by the responder 18, and the user communication logic 21 will be described as having a separate access filter value, referred to as "user filter value" for authenticating messages received by the user communication device 12. In other embodiments, the same access filter value may be used by both the responder logic 25 and the user communication logic 21, if desired.

Figure 5:
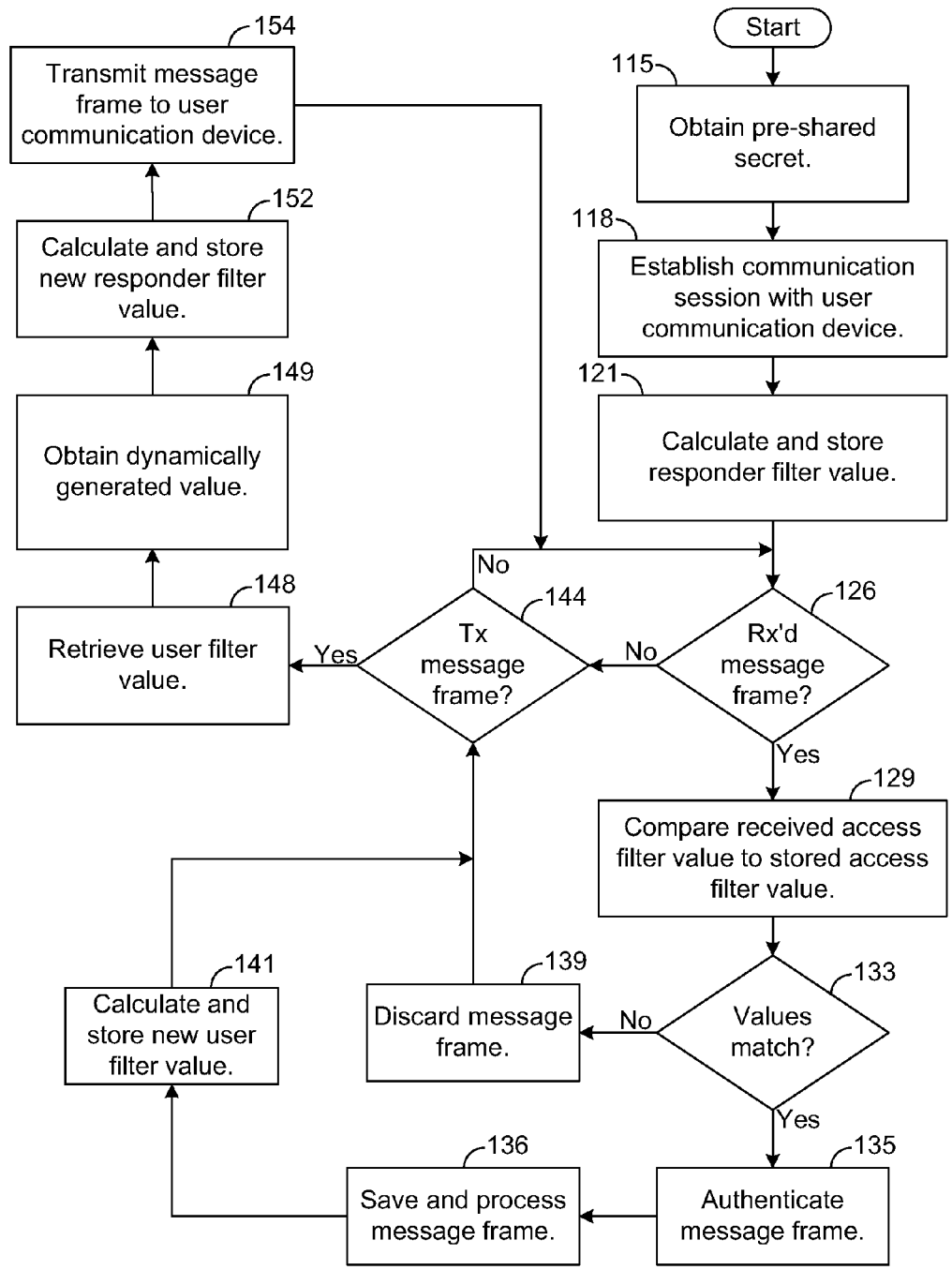
FIG. 5 is a flow chart illustrating an exemplary architecture and functionality of the responder depicted in FIG. 3.
Figure 6:
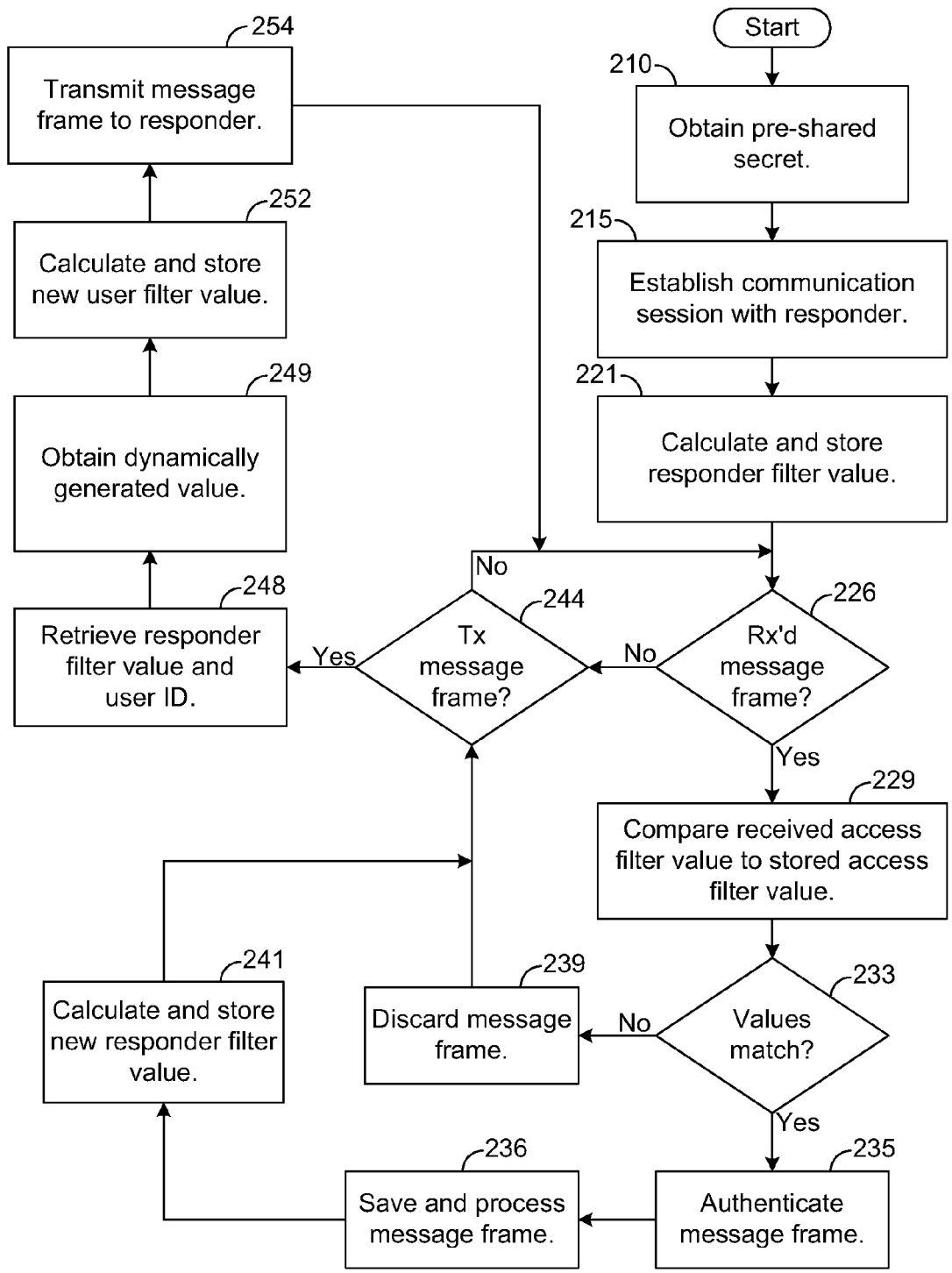
FIG. 6 is a flow chart illustrating an exemplary architecture and functionality of the user communication device depicted in FIG. 2.

Initially, a non-secure communication channel, referred to as "established channel," is established between the user communication device 12 and the responder 18 via network 15, as shown by block 118 of FIG. 5 and block 215 of FIG. 6. Using the established channel, the user communication logic 21 and the responder logic 25 exchange various information, referred to as "exchanged information," such as addresses, keys for encryption/decryption, and/or values that can be used in calculating initial access filter values. In addition, a pre-shared secret that, when combined with the exchanged information, is sufficient for enabling the user communication logic 21 to calculate an initial responder filter value, $F_{R(O)}$, is conveyed to the device 12 via some technique other than using the established communication channel. For example, the pre-shared secret may be verbally or otherwise conveyed from an operator of the transponder 18 to a user of the device 12 who then enters the information via input device 58. In another example, the pre-shared secret may be electronically communicated to the device 12 via a channel other than the established channel. Preferably, such other channel is a secure channel in an effort to protect the pre-shared secret from unauthorized users. Any technique for establishing a pre-shared secret may be used.

The pre-shared secret may include a time stamp value or a randomly generated value and is available to the responder 18. For example, in block 118 of FIG. 5, the responder logic 25 may receive a time stamp from clock 69 (FIG. 3) and/or generate a random number via some random number generating algorithm. Alternatively, an operator of the responder 18 may obtain at least some of the pre-shared secret from another source and enter the pre-shared secret into the responder 18 via input device 58 (FIG. 3). If portions of the pre-shared secret are generated by the responder 18 and if the operator is to convey any of such information to the user, then the responder 18 may be configured to output (e.g., display) such portions to the operator via output device 62 or otherwise. Thus, both the responder 18 and the operator may have access to the pre-shared secret.

The pre-shared secret is ultimately received by the user communication logic 21, as shown by block 210 of FIG. 6. For example, if the operator of the responder 18 conveys the pre-shared secret to the user of device 12, the user may interface such information with the communication device 12, using input device 38 (FIG. 2) or otherwise. After receiving the pre-shared secret, the user communication logic 21 uses such information to calculate the initial responder filter value, $F_{R(O)}$, and then stores $F_{R(O)}$ in memory 31, as shown by block 221 of FIG. 6. Based on the pre-shared secret, the responder logic 25 also calculates $F_{R(O)}$ and then stores $F_{R(O)}$ in memory 51, as shown by block 121 of FIG. 5. In storing $F_{R(O)}$, the responder logic 25 correlates $F_{R(O)}$ with the user ID identifying the user of the device 12. As an example, the responder logic 25 may store $F_{R(O)}$ and the user ID in the same entry of the table 72.

After performance of blocks 121 and 221, both the user communication logic 21 and the responder logic 25 have access to $F_{R(O)}$. The responder 18 and user communication device 21 then communicate using calculated access filter values for authentication. In the current example, which will be described in more detail hereafter, an access filter value is updated each time it is used to authenticate a message. In other examples, an access filter value may be updated at a different frequency and/or based on other factors, such as time, for example.

When the user communication logic 21 determines that a message frame should be transmitted to the responder 18, the user communication logic 21 retrieves the responder filter value, $F_{R(O)}$, and the user ID associated with the user of the device 12, as shown by blocks 244 and 248 of FIG. 6. The user communication logic 21 also obtains at least one dynamically generated value, such as a time stamp or a random number, as shown by block 249 of FIG. 6. Then, the user communication logic 21 calculates and stores a user filter value, $F_{U(O)}$, for authenticating the next message from the responder 18, as shown by block 252. The user communication logic 21 then transmits a message frame to the responder 18, as shown by block 254. In defining the message frame, the user communication logic 21 inserts the responder filter value, $F_{R(O)}$, retrieved in block 248 and the dynamically generated value used to calculate the new user filter value, $F_{U(O)}$, in block 252. Any data in the message and/or the dynamically generated value may be encrypted, but $F_{R(O)}$ is preferably not encrypted.

When the message frame is received at the responder 18, the responder logic 25 makes a "yes" determination in block 126 of FIG. 5 and proceeds to block 129. In particular, the responder logic 25 retrieves, from the responder table 72, the access filter value (i.e., $F_{R(O)}$) that is correlated with the user ID of the message frame. The responder logic 25 then compares the retrieved value to the responder filter value included in the received message frame. In the instant example, the compared values match since the message frame has been transmitted from an authorized user, and the responder logic 25 makes a "yes" determination in block 133. Thus, the responder logic 25 authenticates the message frame in block 135. After authenticating the message frame, the responder logic 25 saves the message frame to memory 51 and processes the message frame in block 136. For example, if a portion of the message frame is encrypted, the responder logic 25 may decrypt the encrypted portion or instruct another component (not specifically shown) of the responder 18 to decrypt the encrypted portion or otherwise process the message frame.

Note that, if the received message frame was transmitted by an unauthorized user instead of the authorized user of the device 12, then such unauthorized user would be unable to include $F_{R(O)}$ in the message. Thus, in such an example, the responder logic 25 would discard the message frame in block 139 without saving and processing the message frame in block 136.

In addition, as shown by block 141 of FIG. 5, the responder logic 25 uses the dynamically generated value included in the received message frame by the user communication logic 21, to calculate the new user filter value, $F_{U(0)}$, to be used to authenticate the next message from the responder 18.

In block 144, the responder logic 25 determines whether to transmit a message frame to the user communication device 12. When the responder logic 25 determines that a new frame is to be transmitted, the responder logic 25 makes a "yes" determination in block 144 after performing block 136. Thus, responder logic 25 retrieves the current user filter value, $F_{U(0)}$, as shown by block 148 of FIG. 5. The responder logic 25 also obtains a dynamically generated value, such as a time stamp or randomly generated value, as shown by block 149 of FIG. 5. Then, the user communication logic 21 calculates and stores a new responder filter value, $F_{R(1)}$, as shown by block 152. The responder logic 25 replaces the previous responder filter value, $F_{R(0)}$, stored in the table 72 with the new access filter value, $F_{R(1)}$. In block 154, the responder logic 25 transmits a message frame that includes the retrieved user filter value, $F_{U(0)}$, and the dynamically generated value used in block 152 to calculate $F_{R(1)}$. Any data and/or the dynamically generated value may be encrypted, but $F_{U(0)}$ is preferably not encrypted.

Based on the dynamically generated value included in the message frame, the user communication logic 21 is able to calculate the new responder filter value, $F_{R(1)}$, in block 252 of FIG. 6 and to include $F_{R(1)}$ in the next message frame transmitted from the user communication device 12 to the responder 18. Therefore, when the responder 18 receives such a message frame, the responder logic 25 will make a "yes" determination in block 133 and authenticate the message frame in block 135.

However, if the responder 18 receives a message frame from an unauthorized user who has discovered $F_{R(0)}$ and inserted $F_{R(0)}$ in the message frame, the responder logic 25 will make a "no" determination in block 133 upon receipt of such a message frame and discard the message frame in block 139 without authenticating it. Thus, even if an unauthorized user discovers $F_{R(0)}$ by, for example, analyzing one of the message frames communicated between the responder 18 and user communication device 12, the unauthorized user will be prevented from using $F_{R(0)}$ to launch a successful denial of service attack.

When the user communication logic 21 receives the message frame containing $F_{U(0)}$, which includes the dynamically generated value used by the responder 18 to calculate the new access control value, $F_{R(1)}$, the user communication logic 21 retrieves the user filter value, $F_{U(0)}$, previously calculated in block 252 of FIG. 6 and compares the retrieved value to the user filter value included in the received message frame. In the instant example, the compared values match since the message frame has been transmitted from the responder 18, and the user communication logic 21 makes a "yes" determination in block 233. Thus, the user communication logic 21 authenticates the message frame in block 235. After authenticating the message frame, the user communication logic 21 saves the message frame to memory 31 and processes the message frame in block 236. For example, if a portion of the message frame is encrypted, the user communication logic 21 may decrypt the encrypted portion or instruct another component (not specifically shown) of the device 12 to decrypt the encrypted portion or otherwise process the message frame.

Note that, if the received message frame was transmitted by an unauthorized user instead of the responder 18, then such unauthorized user would be unable to include $F_{U(0)}$ in the message. Thus, in such an example, the user communication logic 21 would discard the message frame in block 239 without saving and processing the message frame in block 136.

In addition, as shown by block 241, the user communication logic 21 uses the dynamically generated value included in the received message frame by the responder logic 25, to calculate the new responder filter value, $F_{R(1)}$, to be used to authenticate the next message frame transmitted to the responder 18 by the device 12.

Moreover, the responder 18 and the user communication device 12 continue transmitting messages and updating access filter values until the session between the responder 18 and the device 12 is terminated.

It should be noted that the use of a user ID, as described above, is unnecessary. For example, the responder logic 25 can be configured to store different access filter values for different users without correlating such access filter values with user IDs. In such an example, the responder logic 25 may be configured to search the stored access filter values for a value that matches an access filter value from a received message frame. If such a stored access filter value is found, the responder logic 25 may be configured to authenticate the message frame. However, if no such stored access filter value is found, the responder logic 25 may be configured to discard the message frame without authenticating it. In one exemplary embodiment, the responder logic 25 locates the appropriate access filter value based on pseudo IDs (or pseudo identifiers), which are described in U.S. Provisional Patent Application Ser. No. 60/799,606. For example, as described in U.S. Provisional Patent Application Ser. No. 60/799,606, pseudo ID is a scheme that allows the verification of IPACF/Identity-Based Dynamic Access Control Filter (IDF) filter values to become a quick process. The filter value is tabulated as a function of pseudo ID so that the filter value verification process is simply a memory read of an element in a filter value table 72 using the given pseudo ID and a comparison using a conditional jump. In one implementation, the following pseudo code may be used to store and update both the pseudo ID and filter value table 72 on the responder 18:

```
m;                              // maximum number of users
n;                              // number of users
P_Uid [m];                      // pseudo ID table
F_R [m];                        // filter value table
// initialization
for (i = 0; i < m; i++) {
    P_Uid [i] = i;
}
j = m                           // j is for available positions
// When a user registers and Do Loop will run for each user
for (k = 0; k < n-1; k++) {
    random # = rand( );         // generate random #
    New P_id = random # mod j;  // new pseudo ID index
    j = j - 1;                  // decrease the user size
    // shift the Pseudo ID table
    for (i = New P_id; i < j - 1; i++) {
        P_Uid [i] = P_Uid [i+1];
    }
    F_R [New P_id] = initial filter value;   // store initial filter value
}
Do while (a user sends in a message)
// When a user sends in a message
IndexP_Uid;                     // the pseudo ID for the current user
random # = rand( );             // generate random #
```

-continued

```
New P_id = random # mod j;        // new pseudo ID index
// shift the Pseudo ID table
for (i = New P_id; i < j - 1; i++) {
    P_Uid [i] = P_Uid [i+1];
}
```

To further illustrate various aspects of the system 10, an exemplary embodiment will be described hereafter in which both the user communication device 12 and the responder 18 protect against denial of service attacks.

In this regard, a private key, $K_U$, associated with the user of the device 12, a private key, $K_R$, associated with the responder 18, and a random number, $N_i$, are exchanged between the user communication device 12 and responder 18. The values $K_U$, $K_R$, and $N_i$ may be pre-shared secrets. Thus, a secure connection may be used to exchange such information, or other techniques for securely delivering the information to the user communication device 12 and responder 18 may be employed. Although other values of the private keys are possible in other embodiments, $K_U$ and $K_R$ are defined by the following equations in the instant example:

$$K_U = h_{(N_{ui})}[U_{id}\|P_u\|T_u\|N_{ui}] \quad (1)$$

$$K_R = h_{(N_{Ri})}[R_{id}\|P_R\|T_R\|N_{Ri}] \quad (2)$$

where $U_{id}$ is a user identifier (i.e., a value that uniquely identifies the user communication device 12 or a user of the user communication device 12), $P_u$ is a password provided by the user of the user communication device 12, $T_u$ is a time stamp from clock 49, $N_{ui}$ is a nonce value known only by the user communication device 12, $R_{id}$ is a responder identifier (i.e., a value that uniquely identifies the responder 18 or a user of the responder 18), $P_R$ is a password of the responder 18, $T_R$ is a time stamp from clock 69, $N_{Ri}$ is a nonce value known only by the responder 18, $h_{(N_{ui})}$ and $h_{(N_{Ri})}$ are both HMAC functions using key $N_{ui}$ and $N_{Ri}$, respectively.

In addition to the foregoing values, the responder logic 25 and the user communication logic 21 preferably have access to various pre-shared secrets. The pre-shared secrets may be shared via a secured channel separate from the non-secured channel to be used to communicate between the communication logic 21 and the responder logic 25. In the instant example, such pre-shared secrets comprise a nonce value, $N_{INI}$, and a time stamp value, $T_{INI}$. $N_{INI}$ may be any randomly generated value, and $T_{INI}$ may be generated by the clock 69 at the responder 18. However, in other embodiments, other types of information may be used as pre-shared secrets.

After $K_U$, $K_R$, and $N_i$ are defined, the responder logic 25 calculates an access filter value correlated with the user of the device 12 and stores this value in the responder table 72. To calculate the access filter value, the responder logic 25 first calculates a value, referred to hereafter as seed value, $S_{Ri}$, using the following equation:

$$h_{(N_i \oplus K_R)}[N_i\|N_{INI}\|T_{INI}] = S_{Ri} \quad (3)$$

In one exemplary embodiment, $S_{Ri}$ is a 512-bit value, although such a value may comprise other numbers of bits in other embodiments.

After determining $S_{Ri}$, the responder logic 25 calculates a keyed hash value, $MAC_{R(0)}$, which in the instant example is a 512-bit value, although such value may comprise other numbers of bits in other embodiments. In this regard, the responder logic 25 calculates $MAC_{R(0)}$ using the following equation:

$$h_{(S_{Ri})}^{N_i \oplus N_{INI}}[U_{id}\|K_U\|N_i\|N_{INI}\|T_{INI}] = MAC_{R(0)} \quad (4)$$

Figure 7:
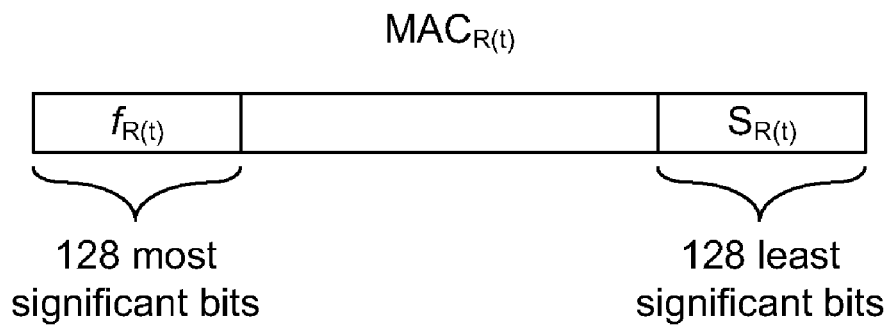
FIG. 7 is a block diagram illustrating an exemplary keyed hash value for calculating an access filter value that is used by the responder depicted in FIG. 3 to authenticate a message frame received from the user communication device depicted in FIG. 2.

Note that $N_i \oplus N_{INI}$ is the number of rounds used to conduct the hash function. From a performance standpoint, it may be desirable that the number be truncated to a certain number of bits, such as 10 (i.e., 0 to 1023 rounds). In the instant embodiment, $MAC_{R(0)}$ is truncated in three parts, which include the 128 most significant bits, $f_{R(t)}$, and the 128 least significant bits, $S_{R(t)}$, as shown in FIG. 7. The parameter, t, is the index of a time-dependent function, and t=0 is the first seed used to generate the initial access filter value.

$f_{R(0)}$ is the seed used to generate the initial access filter value, $F_{R(0)}$, according to the following equation:

$$h_{(S_{Ri})}[K_U\|N_i\|MAC_{R(0)}\|T_{INI}\|f_{R(0)}] = F_{R(0)} \quad (5)$$

In one exemplary embodiment, $F_{R(0)}$ is a 160-bit value, although such a value may comprise a different number of bits in other embodiments. After calculating the initial access filter value, $F_{R(0)}$, the responder logic 25 stores $F_{R(0)}$ in the responder table 72. As described herein, the next message frame received from the user communication device 12 should include $F_{R(0)}$ in order for the responder logic 25 to authenticate the message frame.

After $K_U$, $K_R$, and $N_i$ are defined, the user communication logic 21 uses these values to calculate $F_{R(0)}$ according to the same algorithm used by the responder logic 25 to calculate $F_{R(0)}$ at the responder 18. The user communication logic 21 then stores $F_{R(0)}$ in memory 31 so that this value may later be used to transmit a message frame to the responder 18, as will be described in more detail hereafter.

The user communication logic 21 also calculates an access filter value, $F_{U(0)}$, to be used for authenticating the responder 18, as will be described in more detail hereafter. In this regard, the user communication logic 21 calculates $F_{U(0)}$ according the same algorithm used to calculate $F_{R(0)}$ except that the user communication logic 21 uses different values. In particular, the user communication logic 21 obtains a time stamp, $T_{NU}$, from clock 49 and generates a random number, $N_U$, using any known or future-developed random number generation algorithm. Then, the user communication logic 21 calculates a value, referred to hereafter as seed value, $S_{Ui}$, using the following equation:

$$h_{(K_U \oplus N_i)}[N_i\|N_{INI}\|N_U\|T_{NU}] = S_{Ui} \quad (6)$$

In one exemplary embodiment, $S_{Ui}$ is a 512-bit value, although such a value may comprise other numbers of bits in other embodiments.

After determining $S_{Ui}$, the user communication logic 21 calculates a keyed hash value, $MAC_{U(0)}$, which in the instant example is a 512-bit value, although such value may comprise other numbers of bits in other embodiments. In this regard, the user communication logic 21 calculates $MAC_{U(0)}$ using the following equation:

$$h_{(S_{Ui})}^{N_i \oplus N_U}[U_{id}\|K_U\|N_i\|N_{INI}\|N_U\|T_{NU}] = MAC_{U(0)} \quad (7)$$

Figure 8:
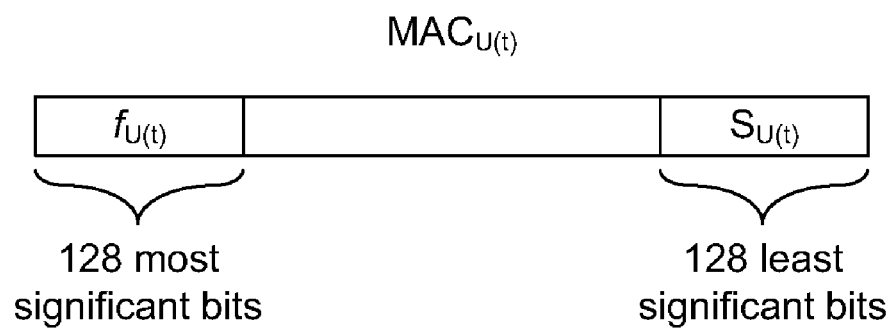
FIG. 8 is a block diagram illustrating an exemplary keyed hash value for calculating an access filter value that is used by the user communication device depicted in FIG. 2 to authenticate a message frame received from the responder depicted in FIG. 3.

Note that $N_i \oplus N_U$ is the number of rounds used to conduct the hash function. From a performance standpoint, it may be desirable that the number be truncated to a certain number of bits, such as 10 (i.e., 0 to 1023 rounds). In the instant embodiment, $MAC_{U(0)}$ is truncated in three parts, which include the 128 most significant bits, $f_{U(t)}$, and the 128 least significant bits $S_{U(t)}$, as shown in FIG. 8. The parameter, t, is the index of a time-dependent function, and t=0 is the first seed used to generate the initial user access filter value, $F_{U(0)}$.

$F_{U(0)}$ is the seed used to generate the initial access filter value, $F_{U(0)}$, according to the following equation:

$$h_{(S_{U_i})}[K_U \| N_U \| MAC_{U(0)} \| T_{NU} \| T_{INI} \| f_{U(0)}] \equiv F_{U(0)} \quad (8)$$

In one exemplary embodiment, $F_{U(0)}$ is a 160-bit value, although such a value may comprise a different number of bits in other embodiments. After calculating the initial access filter value, $F_{U(0)}$, the responder logic 25 stores $F_{U(0)}$ in a user table 181 (FIG. 2). As described herein, the next message frame received from the responder 18 should include $F_{U(0)}$ in order for the user communication logic 21 to authenticate the message frame.

At some point, the user of the device 12 initiates a transmission from the user communication device 12 to the responder 18. As an example, assume that the user of user communication device 12 submits a request to retrieve data stored at the responder 18. Thus, the user communication logic 21 transmits to the responder 18 a message frame, referred to herein as "Frame 1," including data that defines the user's request. To enable the responder 18 to authenticate the message frame, the user communication logic 21 retrieves $F_{R(0)}$, and inserts this value into the message frame. To enable the responder 18 to calculate $F_{U(0)}$, the user communication logic 21 also inserts $T_{NU}$ and $N_U$ into the message frame. If the responder logic 25 is configured to access the responder table 72 based on $U_{id}$, the user communication logic 21 also inserts $U_{id}$ into the message frame.

To provide a more secure environment, the user communication logic 21 may encrypt the data defining the request, as well as $N_U$ and $T_{NU}$ using any known or future-developed encryption technique. As an example, the user communication logic 21 may encrypt $N_U$ and $T_{NU}$ via AES encryption using $K_U$ as an encryption key. Accordingly, referring to FIG. 10, the user communication logic 21 transmits Frame 1, which is represented as reference arrow 401. In the nomenclature used in FIG. 10, the expression E[ ] represents encrypted terms. Thus, "E[$N_U$, $T_{NU}$]" for Frame 1 indicates that $N_U$ and $T_{NU}$ are included in Frame 1 and are encrypted. On the other hand, "$F_{R(0)}$" for Frame 1 indicates that $F_{R(0)}$ is included in Frame 1 in unencrypted form.

Upon receiving Frame 1, the responder logic 25 compares the access filter value (i.e., $F_{R(0)}$) within the message frame to the access filter value (i.e., $F_{R(0)}$) correlated with the user by the responder table 72. In the instant example, the compared values match, and the responder logic 25 therefore authenticates Frame 1. Thus, the responder logic 25 stores a state of the message frame and further processes the message frame.

As an example, the responder logic 25 may decrypt the request for data, as well as $N_U$ and $T_{NU}$, included in the message frame. Based on $N_U$ and $T_{NU}$, the responder logic 25 calculates $F_{U(0)}$ according to the same algorithm used by the user communication logic 21 to calculate $F_{U(0)}$ at the user communication device 12. The responder logic 25 then stores $F_{U(0)}$ in memory 51 so that this value may later be used to transmit a message frame to the user communication device 12, as will be described in more detail hereafter.

The responder logic 25 is also configured to obtain a new time stamp, $T_{RF(1)}$, and to calculate a new access filter value, $F_{R(1)}$, based on $T_{RF(1)}$. In particular, to calculate $F_{R(1)}$, the responder logic 25 uses equations 1 and 3-5 described above except that the responder logic 25 uses $T_{RF(1)}$ in place of $T_{NR}$. In the responder table 72, the responder logic 25 then overwrites $F_{R(0)}$ with $F_{R(1)}$. Thus, for the next message frame received from user communication device 12, $F_{R(1)}$ instead of $F_{R(0)}$ will be used to authenticate the message frame.

In processing Frame 1 received from user communication device 12, the responder logic 25 retrieves the data requested by the user. The responder logic 25 then transmits a message frame, referred to herein as "Frame 2," including this data to the user communication device 12. To enable the user communication logic 21 to authenticate the message frame according to techniques described herein, the responder logic 25 includes $F_{U(0)}$ in the message frame. Further, to enable the user communication logic 21 to calculate the new access filter value, $F_{R(1)}$, to be used in the next message frame transmitted from the user communication device 12 to the responder 18, the responder logic 25 also inserts $T_{RF(1)}$ in Frame 2. Thus, upon receiving the message frame from the responder 18, the user communication logic 21 is able to validate the message frame based on $F_{U(0)}$ and to calculate $F_{R(1)}$.

Further, in one embodiment, the private keys $K_U$ and $K_R$ are updated every session. Thus, upon receiving Frame 1, the responder logic 25 generates a new value for $K_R$, referred to hereafter as $K_{R(next)}$, which will be used as $K_R$ in the next session between the responder 18 and the user communication device 12. The responder logic 25 encrypts $K_{R(next)}$ and transmits $K_{R(next)}$ in encrypted form in Frame 2, which is represented as arrow 402 in FIG. 10.

Upon receiving Frame 2, the user communication logic 21 compares the access filter value (i.e., $F_{U(0)}$) within the message frame to the access filter value (i.e., $F_{U(0)}$) stored at the device 12. In the instant example, the compared values match, and the user communication logic 21 therefore authenticates Frame 2. Thus, the user communication logic 21 stores a state of the message frame and further processes the message frame.

As an example, the user communication logic 21 may decrypt the data, as well as $T_{RF(1)}$ and $K_{R(next)}$, included in the message frame. Based on $T_{RF(1)}$, the user communication logic 21 calculates $F_{R(1)}$ according to the same algorithm used by the responder logic 25 to calculate $F_{R(1)}$. The user communication logic 21 then stores $F_{R(1)}$ in memory 31 so that this value may later be used to transmit a message frame to the responder 18, as will be described in more detail hereafter.

The user communication logic 21 is also configured to obtain a new time stamp, $T_{UF(1)}$, and to calculate a new access filter value, $F_{U(1)}$, based on $T_{UF(1)}$. The user communication logic 21 then overwrites $F_{U(0)}$ with $F_{U(1)}$. Thus, for the next message frame received from responder 18, $F_{U(1)}$ instead of $F_{U(0)}$ will be used to authenticate the message frame.

In transmitting the next frame, referred to as "Frame 3," the user communication logic 21 includes $F_{R(1)}$ to enable the responder logic 25 to authenticate the message frame according to techniques described herein. Further, to enable the responder logic 25 to calculate the new access filter value, $F_{U(1)}$, to be used in the next message frame transmitted from the responder 18 to the user communication device 12, the user communication logic 21 also inserts $T_{UF(1)}$ in Frame 3. Thus, upon receiving the message frame from the device 12, the responder logic 25 is able to validate the message frame based on $F_{R(1)}$ and to calculate $F_{U(1)}$.

Further, the user communication logic 21 generates a new value for $K_U$, referred to hereafter as $K_{U(next)}$, which will be used as $K_U$ in the next session between the responder 18 and the user communication device 12. The user communication logic 21 encrypts $K_{U(next)}$ and transmits $K_{U(next)}$ in encrypted form in Frame 3, which is represented as arrow 403 in FIG. 10.

Figure 10:
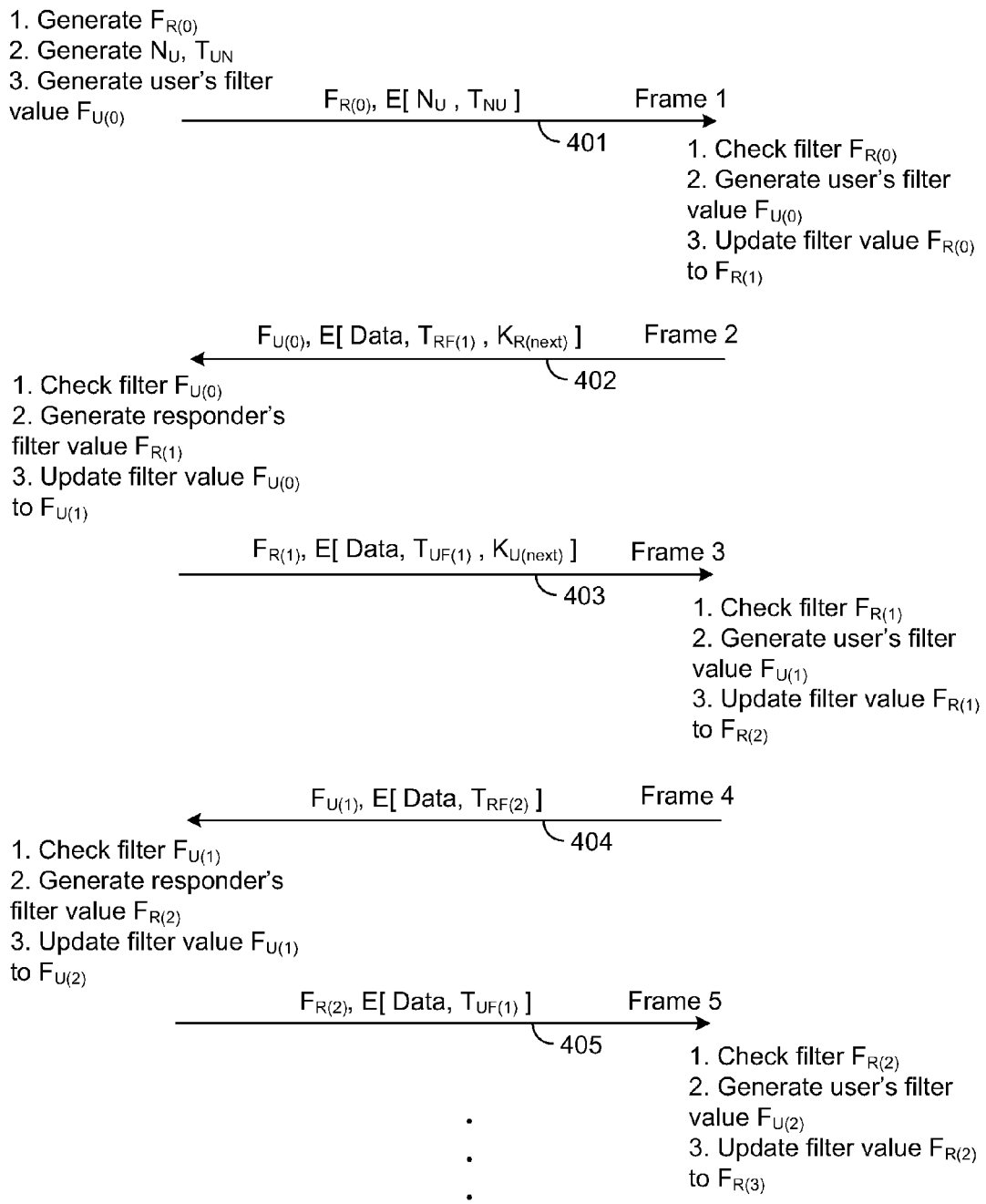
FIG. 10 is a diagram illustrating an exemplary sequence of message frames in accordance with the present disclosure.

Moreover, the access filter values may continually be updated and used, as described above, to authenticate the message frames being communicated between the responder 18 and user communication device 12. For example, as shown by FIG. 10, the responder logic 25 includes an updated filter value for the user (i.e., $F_{U(1)}$) in frame 4, which is represented as arrow 404, and the user communication logic 21 includes an updated filter value for the responder (i.e., $F_{R(2)}$) in frame 5, which is represented as arrow 405.

Note that, to provide a more secure environment, the key $K_U$, as well as $N_{ui}$ and $T_U$, may be updated each time a user initiates a new session. In this regard, a session refers to the time period between the times that the user of the device 12 logs-in and logs-off the device 12. When the user logs in, the user communication logic 21 may be configured to generate a new $K_U$, $N_{ui}$, and $T_U$. During the session, such values may be communicated to the responder 18 via one or more message frames. Thus, for the next session initiated by the user, the new values of $K_U$, $N_{ui}$, and $T_U$ may be used in lieu of the previous values of $K_U$, $N_{ui}$, and $T_U$ to calculate the access filter values as described herein.

Figure 9:
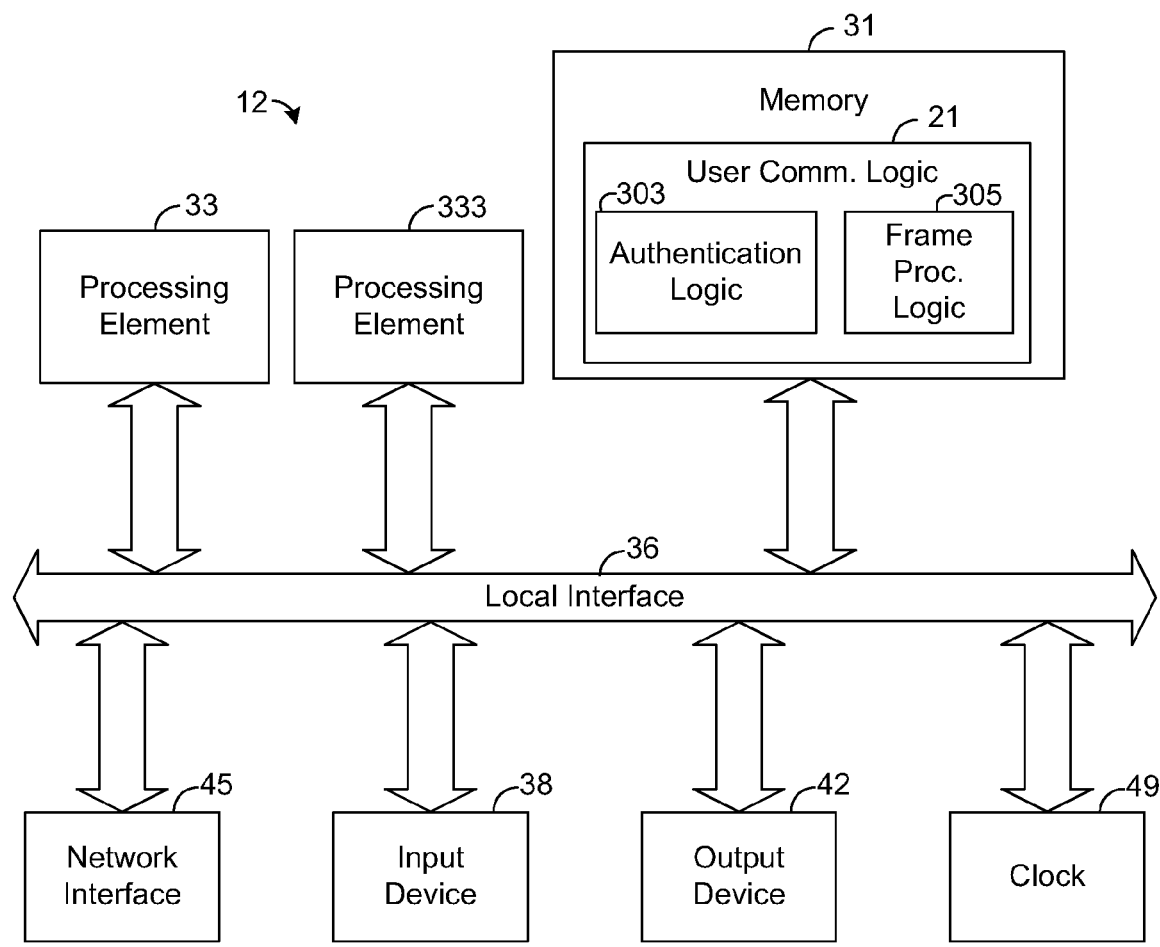
FIG. 9 is a block diagram illustrating an exemplary embodiment of the user communication device depicted in FIG. 1.

If desired, the user communication logic 21 and/or the responder logic 25 can be segmented into separate components that run independently of each other in an effort to enhance performance. For example, FIG. 9 depicts an exemplary embodiment of the user communication device 12. As shown by FIG. 9, the user communication logic 21 is segmented into two sets of logic, authentication logic 303 and frame processing logic 305. In the example shown by FIG. 9, the authentication logic 303 and the frame processing logic 305 are implemented in software and stored in memory 31, but the authentication logic 303 and/or the frame processing logic 305 may be implemented in hardware or a combination of hardware and software in other embodiments.

The authentication logic 303 runs on a first processing element 33 and the frame processing logic 305 separately runs on a second processing element 333. Further, the authentication logic 303 performs authentication of message frames received from network 15 according to the techniques described herein, and the processing element 333 further processes authenticated message frames. In this regard, when a message frame is received from the network 15, the authentication logic 303 determines whether the message frame is from an authorized user according to the techniques described herein. If not, the authentication logic 303 discards the message frame, and the frame processing logic 305 is not burdened with the task of processing the message frame. However, if the message frame is authenticated by logic 303, the logic 303 stores the message frame to a location in memory 31 and passes a pointer to such location to the frame processing logic 305. The frame processing logic 305 then uses the pointer to access and further process the message frame. Since the frame processing logic 305 runs on a separate processing element 333, the authentication tasks performed by the authentication logic 303 do not burden the processing element 333 that executes the frame processing logic 305. Thus, authentication tasks should not have a significant impact, if any, to the performance of the frame processing logic 305 and the memory space of frame storage.

In other examples other numbers of processing elements may be employed, and the user communication logic 21 may be segmented into a different number of components. Also, tasks may be allocated to the various components of the logic 21 in a different manner than that described above. In addition, having the different components of the logic 21 run on separate hardware resources is not necessary to achieve some of the performance benefits described above. For example, it is possible for the processing element 33 to be multi-threaded and for one component of the logic 21 to run on one thread while another component runs on another thread. Further, multi-core processors are now being developed and are available. It is possible to have one core of a processor to execute one component of the logic 21 and for another core of the same processor to run another component of the logic 21. Moreover, various modifications to the embodiments described herein would be readily apparent to one of ordinary skill in the art.

In addition, the responder logic 25 may be segmented into multiple components, as described above for the user communication logic 21, in an attempt to enhance the performance of the responder logic 25 via similar techniques.

What is claimed is:

1. A method for protecting communication devices from denial of service attacks, comprising:
    calculating, at a first device, an access filter value uniquely associated with a second device using one or more secrets shared between the first device and the second device;
    tabulating the access filter value uniquely associated with the second device in an array, wherein the first device tabulates the access filter value in the array based on a pseudo identifier uniquely assigned to the second device;
    receiving a message from the second device at the first device, wherein the message received from the second device includes a hash value that the second device calculated using the one or more secrets shared between the first device and the second device;
    reading the access filter value uniquely associated with the second device from the array, wherein the first device reads the access filter value from the array based on the pseudo identifier uniquely assigned to the second device; and
    authenticating the message received from the second device in response to the first device determining that the hash value included in the message matches the access filter value read from the array.

2. The method of claim 1, further comprising creating the pseudo identifier uniquely assigned to the second device in response to the first device receiving a request to register the pseudo identifier from the second device.

3. The method of claim 2, wherein creating the pseudo identifier uniquely assigned to the second device includes:
    assigning an index to the pseudo identifier uniquely assigned to the second device based on a random number and an available number of elements in the array, wherein the first device tabulates the access filter value uniquely assigned to the second device in the array based on the index assigned to the pseudo identifier; and
    decrementing the available number of elements in the array in response to assigning the index to the pseudo identifier uniquely assigned to the second device.

4. The method of claim 3, further comprising shifting a table that includes a plurality of available pseudo identifiers in response to decrementing the available number of elements in the array, wherein the pseudo identifier uniquely assigned to the second device comprises one of the plurality of available pseudo identifiers in the table.

5. The method of claim 1, further comprising performing, at the first device, a comparison and a conditional jump to determine whether the hash value included in the message matches the access filter value read from the array.

6. The method of claim 1, wherein the one or more secrets include one or more hash functions and one or more random values.

7. The method of claim 6, wherein the first device inputs the one or more random values to the one or more hash functions to calculate the access filter value, and wherein the second device inputs the one or more random values to the one or more hash functions to calculate the hash value included in the message.

8. The method of claim 1, wherein the first device and the second device are physically connected to one another.

9. The method of claim 1, wherein the first device and the second device are connected to one another over a network.

10. The method of claim 1, further comprising transmitting, from the first device to the second device, data that the second device requested in the message in response to the first device authenticating the message received from the second device.

* * * * *